June 27, 1967 W. C. REED 3,327,383
METHOD OF MAKING CLAD PIPE
Filed Jan. 3, 1963
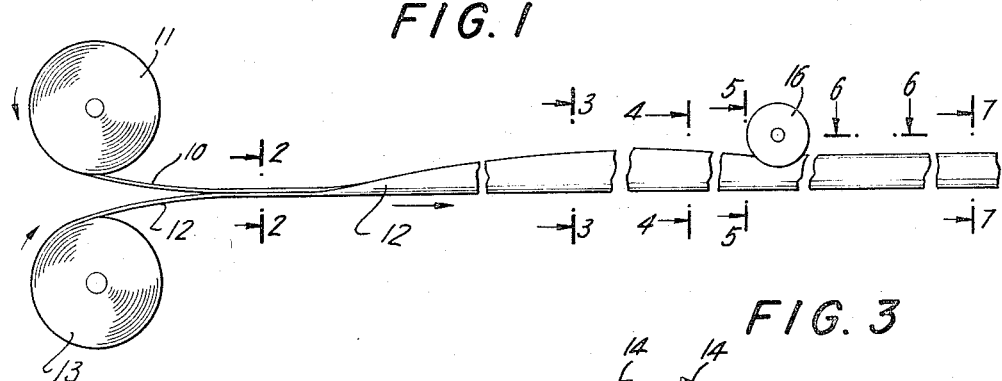
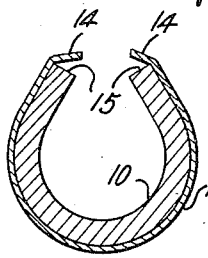
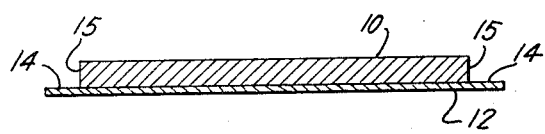
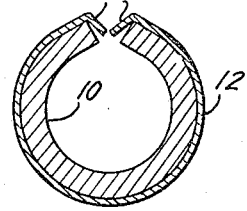
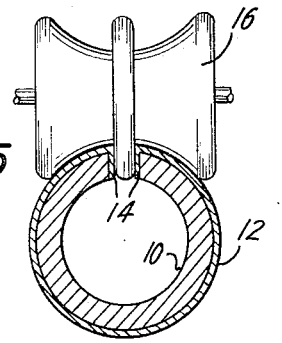
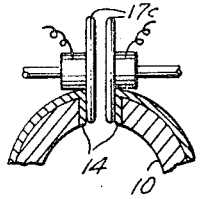
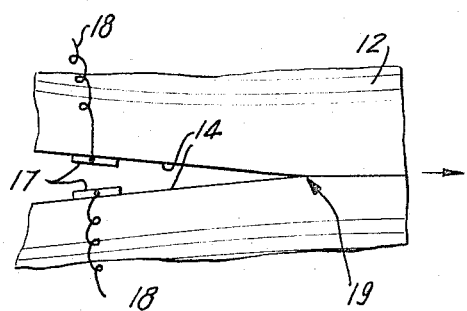
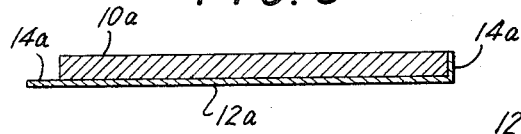
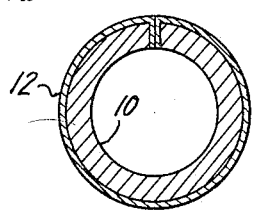
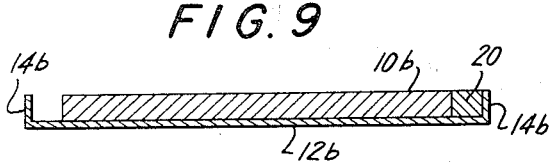
INVENTOR:
WALTER C. REED
BY Frederick Breitenfeld
ATTORNEY United States Patent Office 3,327,383
Patented June 27, 1967

3,327,383
METHOD OF MAKING CLAD PIPE
Walter C. Reed, North St., Dalton, Mass. 01226
Filed Jan. 3, 1963, Ser. No. 249,258
4 Claims. (Cl. 29—474.1)

This invention relates generally to the manufacture of pipe, and has particular reference to clad pipe consisting of a relatively thick inner layer ensheathed in a snugly-fitting outer layer of relatively thin metal.

Clad pipe has many uses in industry as a material from which structural elements can be formed, the outer layer being usually composed of resistant ornamental material such as stainless steel or the like, the inner layer being of less expensive rigid material adequate to provide the desired structural strength. Heretofore it has been common practice separately to make tubes of the inner and outer materials and then to fit them together telescopically. This procedure is relatively costly, calls for unusually precise manufacturing techniques, does not always afford as snug a fit as may be desired, and precludes the use of a manufacturing process of continuous character.

Some of these disadvantages can be overcome by first completing the formation of the inner tube and then, by a continuous ensheathing operation, applying the outer tube. However, this is a relatively lengthy and costly procedure, and necessarily presents the new problem of adequately avoiding the formation of an undesirable longitudinal protrusion along the seam joint of the outer layer.

Another procedure heretofore employed involves a preliminary bonding of the outer layer to the inner layer while the latter is in flat strip form, but a major disadvantage arises from the fact that the bending of such a laminated unit into a tubular condition involves a stretching of the thinner layer. Such stretching often results in uneven thicknesses or ruptures of the outer sheath.

It is a general objective of this invention to provide a thoroughly practical and economical manufacturing procedure which obviates these disadvantages and affords several advantages not heretofore attainable. One of these advantages lies in an ability to produce the desired clad pipe in a continuous manner, with all the commercial advantages that continuity of operation affords. Another advantage resides in the ability to create a reliably uniform product having a smooth outer surface with no protrusions.

The attainment of these objectives is predicated upon the employment of separate unbonded layers of material in the form of flat strips of indefinite length, the strips being brought into overlying relationship during a continuous longitudinal advancement. The heavier strip has a width approximately equal to the outer circumference of the pipe to be formed, and the thinner strip is slightly wider. The overlying strips are subjected to a step-by-step bending operation that brings the longitudinal edges together to establish the desired tubular shape, and sometime prior to the completion of this operation the margins of the thinner strip are turned through 90° to lie over the adjacent edges of the inner strip. The turned margins define panels that are gradually brought into face-to-face contact, and the completion of the procedure involves a welding together of these panels.

Several ways of achieving the objects and advantages of the invention are illustrated in the accompanying drawings, in which:

FIG. 1 is a diagrammatic representation of the manufacturing process, parts being broken away;

FIGS. 2, 3, 4, 5 and 7 are cross-sectional views along correspondingly-marked lines of FIG. 1, showing successive stages of the procedure;

FIG. 6 is an enlarged fragmentary view substantially in the direction 6—6 of FIG. 1, diagrammatically depicting the welding operation;

FIG. 6a is a view similar to FIG. 5 illustrating a modification; and

FIGS. 8 and 9 are views similar to FIG. 2, illustrating other possible modifications of the process.

It is to be understood that FIGS. 1 and 6 are merely representational, and not drawn to a true dimensional scale. Thus, the breaks shown in FIG. 1 are intended to indicate that the successive stages depicted in the cross-sectional views are not necessarily reached in close proximity to one another. Similarly, the roller shown in FIG. 5, is, of course, not the only roller involved, since the procedure requires the employment of a succession of squeezing and forming rollers, well know per se. In the cross-sectional figures, the dimensional relationships are exaggerated, and the same is true of the welding step depicted in FIG. 6.

A supply of strip material 10, of indefinite length, is illustrated in the form of a coil 11 in FIG. 1. It consists of a flat strip of the relatively thick bendable metal or other material of which the inner layer of the desired pipe is to be composed. The strip has a width approximating the outer circumference of the pipe to be produced. Its thickness will vary depending upon the nature and purpose of the product to be made. Merely by way of example, it may be desired to produce a pipe having a 1-inch diameter, in which case the strip 10 would be a little over 3 inches wide, and might have a thickness of, say, 1/16 of an inch.

A second supply strip 12 of indefinite length may be made available in the form of a similar coiled supply roll 13. This strip will form the outer sheath of the pipe to be made. It may be composed of any appropriate bendable metal, for example, stainless steel, and it is slightly wider than the strip 10, as best indicated in FIG. 2. It is considerably thinner than the strip 10, and its thickness may be of any desired magnitude, even as small as from .002 to .015 inch, regardless of the width or thickness of the strip 10.

The strips 10 and 12 are brought together into overlying but unbonded relationship as shown in FIG. 2, and in the procedure illustrated in FIGS. 2–5 the margins 14 of the strip 12 extend by equal amounts beyond the corresponding edges 15 of the strip 10.

During a continuous advance of the strips, they are subjected to the step-by-step successive bending operations of tube-forming roller sets (not shown). Power-driven rolling mills of this kind are well known, and they function to advance the strip being treated, while progressively forming it to the desired tubular cross-section. This progressive deformation is indicated by the stages represented in FIGS. 3, 4, 5 and 7. During this bending operation, the margins 14 are turned (by appropriately shaped rollers) so that ultimately they lie directly over the edges 15 of the inner layer. For illustrative purposes one of the final shaping rollers might assume a form such as that indicated at 16 in FIG. 5, bringing the margins 14 into substantially parallel face-to-face relationship. The margins 14 thus define opposed panels which are ultimately brought into contact with each other as indicated in FIG. 6, the panels being then welded together under suitable pressure, thus completing the formation of the desired clad pipe as indicated in FIG. 7.

The welding procedure may be of any desired continuous character. For example, a procedure involving the passage of high-frequency electric current, as indicated in FIG. 6, may be used. In such a procedure (which is of known kind and is shown, for example, in U.S. Patent No. 2,794,108) the opposed panels 14 are guided over electrodes 17 to which a high-frequency current of appropriate magnitude is supplied, as indicated by lead wires 18 in FIG. 6. The current flows along the outer faces of the panels 14 to and across the point 19 at which they come into contact, and in this region rollers of proper shape and size apply the pressure that is necessary to weld the panels 14 together.

Other welding procedures of similar continuous character may be employed, if desired. One alternative might involve induction heating, as described in U.S. Patent No. 2,687,464, whereby the almost-completed pipe (in the region of FIG. 6, for example) is subjected to the heating effect of an induction coil arranged to encircle the pipe. The coil is fed with electric current of adequate magnitude and character to accomplish this result.

In FIG. 6a I have shown electrodes 17c in the form of flanged rollers arranged in opposed relation with their flanges bearing against the turned-in margins 14 of the outer layer. Such elements may serve the dual purpose of feeding the required electric current and helping to press the inturned margins firmly against the edges of the inner layer. Thus the electrodes 17c may assume some or all of the function of the forming roller 16 shown in FIG. 5.

In FIG. 8 I have illustrated the possibility of bending one longitudinal margin 14a of the outer strip 12a before the bending of the strip pair into tubular shape. In this procedure, the turned-up margin 14a is pressed against the adjacent edge of the inner strip 10a and retained in this contacting relationship during the ensuring stages of manufacture. During the bending procedure the opposite margin 14a is gradually turned up so that when the product reaches the stage of FIG. 5 (or FIG. 6a) the parts are in the relationship hereinbefore described, and the procedure is then completed.

In FIG. 9 an alternative procedure is indicated, in which both margins 14b of the thinner outer strip 12b are turned up through approximately 90° before the commencement of the tube-bending operation. In such a case, the strips may be guided over a spacer or spacers 20 prior to their entry into the tube-shaping mechanism, so as to establish a desired preliminary positional relationship.

In all of the procedures referred to, the bending of the strips into tubular condition is accompanied by a relative sliding movement between the strips, stemming from the fact that the inner circumference of a tube is smaller than the outer circumference. The bending of a flat sheet thus imposes compressional stresses upon its concave face, and tensional stresses along its convex face. These stresses are proportional to the thickness of the strip that is bent, and in the thinner outer strip they are minute. The circumstance that the strips employed in carrying out the present invention are purposely left in unbonded relationship allows the free movement of one strip over the other and thus leaves the outer strip substantially unstretched and undistorted with its original thickness uniformly maintained. It is for this reason that the outer layer can be made extremely thin without jeopardizing the uniformity and intactness of the surface of the outer sheath.

Moreover, in carrying out the present invention, the outer sheath is caused to fit snugly on the inner layer under all circumstances, provided that the turning up of the margins is properly carried out. This can be reliably achieved by proper design and placement of the forming rollers to which the strips are subjected. Once the forming apparatus has been properly set, the manufacturing process can be carried out continuously with reliably uniform results.

The product produced is unusually uniform in quality, and its outer surface is unmarred and smooth because the welding together of the inturned margins of the outer sheath creates no protrusion on the outside of the pipe. The resultant clad pipe can be said to embody an inner layer provided with a continuous longitudinal fissure into which the inturned margins of the outer sheet extend, and the pipe is characterized by the circumstance that the inner and outer layers are secured together only by the snug ensheathing relationship and the disposition of the mutually welded margin of the outer layer within the fissure in the inner layer.

In general, it will be understood that many of the details herein described and illustrated may be modified by those skilled in the art without necessarily departing from the spirit and scope of the invention as expressed in the appended claims.

What is claimed is:

1. The method of making clad pipe consisting of a relatively thick bendable inner layer ensheathed in a snugly fitting outer layer of bendable relatively thin metal, which comprises the procedural steps of—
   (a) bringing lengths of said layers, in flat strip form, into superposed unbonded contact,
      the widths being approximately equal to the outer circumference of the pipe to be formed,
      the thinner layer being slightly wider than the other,
   (b) bending said strips into tubular form by bringing the longitudinal edges into adjacent opposed relation,
      the thinner layer being on the outside and sliding on the inner layer during the bending procedure, thereby preserving its original thickness,
   (c) turning the longitudinal margins of the outer layer over the corresponding longitudinal edges of the inner layer and completing this turning procedure prior to the time when the bending operation (b) has established the tubular form, whereby said turned margins define inturned panels that are brought into face-to-face relationship, and
   (d) welding said panels together by means of a high frequency electric current.

2. The method defined in claim 1, wherein the strips are of indefinite lengths and are moved longitudinally as they are brought together during step (a), the subsequent steps being performed during continued movement of the strips so that the clad pipe is produced in a continuous manner.

3. The method defined in claim 2, wherein the turning of at least one of the margins of the outer layer, according to step (c), is completed prior to the commencement of the bending operation (b).

4. The method defined in claim 2, wherein the turning of at least one of the margins of the outer layer, according to step (c), is completed prior to the commencement of the bending operation (b), and wherein said turned margin is immediately abutted against the adjacent edge of the inner layer and retained in such abutment during the bending operation.

References Cited
UNITED STATES PATENTS

| | | | |
|---|---|---|---|
| 910,814 | 1/1909 | Hellmich | 29—474.1 |
| 1,907,307 | 5/1933 | Smith | 138—152 |
| 2,199,150 | 4/1940 | Chace | 138—152 |
| 2,212,715 | 8/1940 | Levan | 138—151 |
| 2,387,051 | 8/1945 | Blatz | 29—474.1 |

JOHN F. CAMPBELL, *Primary Examiner.*